US011467997B2

(12) United States Patent
Killen, Jr. et al.

(10) Patent No.: US 11,467,997 B2
(45) Date of Patent: Oct. 11, 2022

(54) HOT-SWAPPABLE PROTOCOL EXPANDER MODULE FOR STORAGE ARRAY

(71) Applicant: Seagate Technology LLC, Cupertino, CA (US)

(72) Inventors: Odie Banks Killen, Jr., Colorado Springs, CO (US); David Dick Anderson, New Braunfels, TX (US); John Davis Schnabel, Hampshire (GB)

(73) Assignee: Seagate Technology LLC, Fremont, CA (US)

( * ) Notice: Subject to any disclaimer, the term of this patent is extended or adjusted under 35 U.S.C. 154(b) by 858 days.

(21) Appl. No.: 15/439,024

(22) Filed: Feb. 22, 2017

(65) Prior Publication Data

US 2018/0239734 A1  Aug. 23, 2018

(51) Int. Cl.
*G06F 13/40* (2006.01)
*G06F 13/16* (2006.01)
*G06F 13/42* (2006.01)
*G11B 33/12* (2006.01)
*G11B 33/14* (2006.01)

(52) U.S. Cl.
CPC ...... *G06F 13/4081* (2013.01); *G06F 13/1668* (2013.01); *G06F 13/409* (2013.01); *G06F 13/4265* (2013.01); *G11B 33/126* (2013.01); *G11B 33/128* (2013.01); *G11B 33/1426* (2013.01)

(58) Field of Classification Search
CPC .................................................. G06F 13/4081
See application file for complete search history.

(56) References Cited

U.S. PATENT DOCUMENTS

| | | | |
|---|---|---|---|
| 5,485,590 A * | 1/1996 | Hyatt | G05B 19/054 700/86 |
| 6,392,884 B1 | 5/2002 | Chou | |
| 6,535,381 B2 * | 3/2003 | Jahne | G06F 1/184 312/223.1 |
| 7,917,682 B2 * | 3/2011 | Bakthavathsalam | G06F 3/0607 710/315 |
| 9,395,767 B2 | 7/2016 | McCabe et al. | |
| 2008/0126631 A1 | 5/2008 | Bailey et al. | |
| 2010/0328493 A1 * | 12/2010 | Hanlon | H04N 5/765 348/231.9 |
| 2011/0219158 A1 | 9/2011 | Davis et al. | |
| 2011/0222234 A1 | 9/2011 | Davis et al. | |
| 2011/0261526 A1 | 10/2011 | Atkins et al. | |
| 2015/0009616 A1 | 1/2015 | Adrian et al. | |

* cited by examiner

*Primary Examiner* — Henry Tsai
*Assistant Examiner* — Junito Borromeo
(74) *Attorney, Agent, or Firm* — Mueting Raasch Group

(57) ABSTRACT

A data storage array has a backplane at the base of an enclosure. A plurality of data storage drives are coupled to connectors of the backplane. A hot-swappable protocol expander module is coupled between the drives and the backplane through a top of the enclosure or to the backplane through a side of the enclosure.

11 Claims, 8 Drawing Sheets

HOT-SWAPPABLE PROTOCOL EXPANDER MODULE FOR STORAGE ARRAY

SUMMARY

The present disclosure is related to a hot-swappable protocol expander module for a storage array. In one embodiment, a data storage array, includes an enclosure with a backplane at the base of the enclosure. The backplane has a plurality of connectors, and a plurality of data storage drives are coupled to the connectors. A major surface of the data storage drives are normal to the backplane. A protocol expander module is coupled to the backplane between at least one of the data storage drives and the backplane. The protocol expander module is hot-swappable from the backplane.

In another embodiment, a data storage array includes an enclosure and a backplane at the base of the enclosure. A plurality of connectors are on a top surface of the backplane, the connectors configured to couple to an array of data storage drives. A protocol expander module is slidably removably via an opening in a side of the enclosure. The side of the enclosure is covered by a corresponding side of a rack in a rack-mounted configuration of the enclosure. The protocol expander module interfaces via a connector to a lower surface of the backplane that is opposed to the top surface.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures.

DETAILED DESCRIPTION

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

The present disclosure is generally related to expander modules used in storage array enclosures. For example, a storage enclosure includes facilities for mechanically and electrically coupling a large number of hard disk drives (HDD) or other devices (e.g., solid-state drives (SSDs), optical drives, tape drives, monitoring devices) in a single enclosure. Generally, the enclosure may include a backplane circuit board that provides data and power connectivity for the individual devices. Such enclosure may include dedicated processors for managing data inputs and outputs to other nodes of a computing system. For example, a mass-storage enclosure may be configured as a storage server that provides persistent storage for nodes of a networked data center.

In some cases, the backplane can configured to be flexibly configured to handle different point-to-point storage protocols, such a Small Computer System Interface (SCSI), Serial Attached SCSI (SAS), Serial AT Attachment (SATA), Peripheral Component Interconnect (PCI), PCI Express (PCIe), Fibre Channel, Ethernet, etc. To do this, the backplane accepts one or more protocol expander modules. Such a module can support data transfer different protocols. The enclosure and backplane provide power and physical connectivity which may be common for all of the individual storage devices, or adaptable for different devices using mounting adapters and/or adapter connectors/cables.

Because data center operators want as much data storage as possible in as little space as possible, a protocol expander module should not sacrifice drive count. Further, such a module should be hot-swappable, meaning it can be removed and installed without powering down the entire storage array, and also with minimal effort (e.g., tool-less, not requiring significant enclosure disassembly, etc.). In the following disclosure, embodiments show two variations of protocol expanders that meet these specifications.

Figure 1:
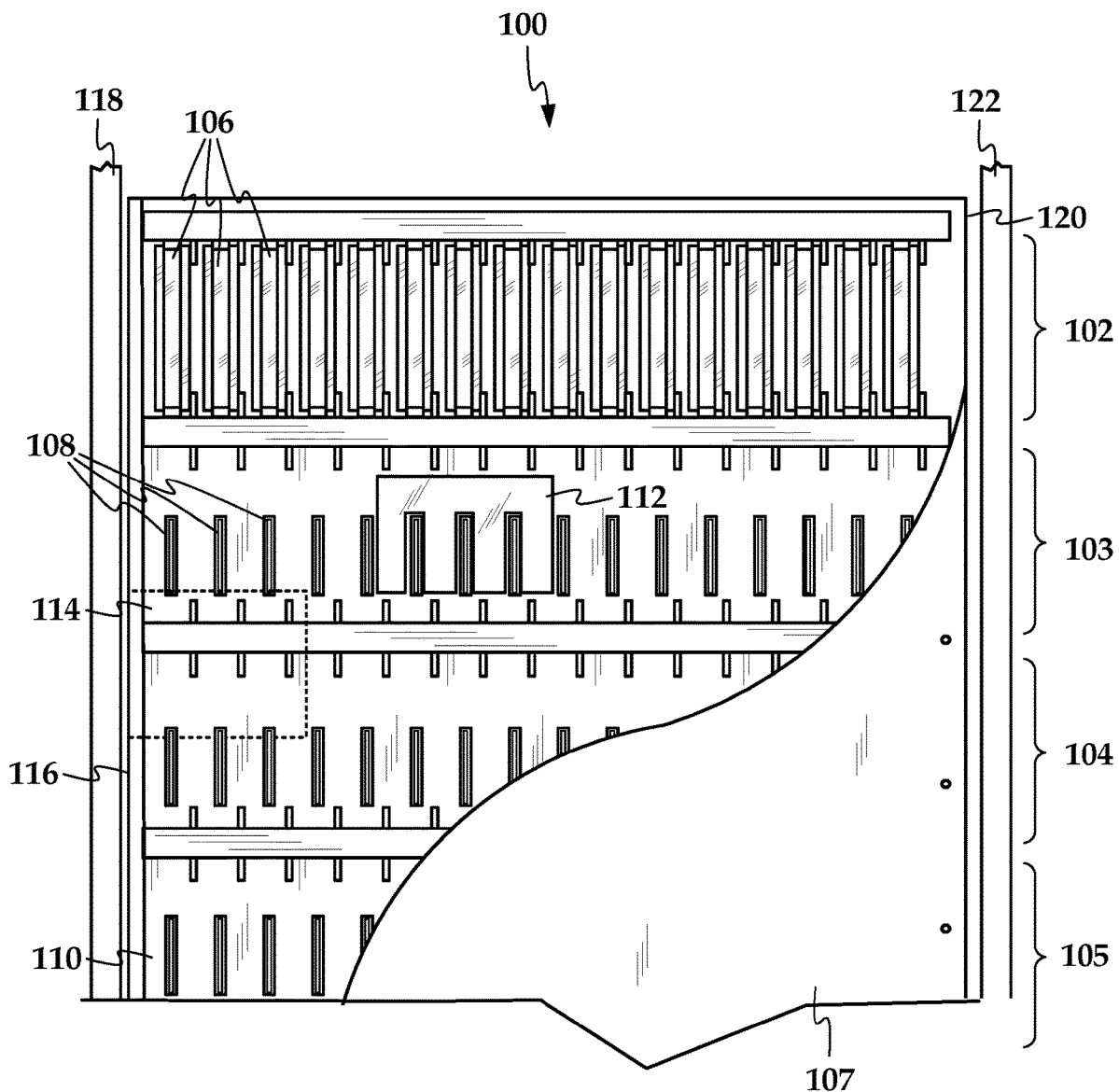
FIG. 1 is a top view of a drive array according to an example embodiment.

An example drive array enclosure 100 is shown in the partial top view of FIG. 1. The enclosure 100 includes rows 102-105 that each store an array of storage drives 106 (e.g., HDD, SSD) or other compatible devices. Row 102 is shown with drives installed, and rows 103-105 are shown without hard drives or other devices installed. A cover 107 is shown on top of the enclosure 100. The cover 107 is shown partially cutaway to reveal the interior of the enclosure 100.

The storage drives 106 interface with connectors, e.g., connectors 108, coupled to a backplane 110 (also referred to as base plane or base board). The storage drives 106 are oriented such that a major surface (e.g., one of the largest sides or covers of the drive) is perpendicular to the backplane 110. The connectors 108 provide data and power lines to the storage devices 106, as well as some amount of physical support. Other parts of the enclosure, such as side rails, locks, etc. also provide physical support for the drives. The connectors 108 and storage drives 106 may be able to support a number of different storage protocols. This can be done configurably by the end-user via the addition of protocol modules. Two different expander module configurations 112, 114, are shown in FIG. 1.

Expander module 112 is coupled to the backplane 110 between at least one of the data storage drives 106 and the backplane 110. The expander module is hot-swappable from the backplane by removing one or more of the storage drives 106. In this example, five drives 106 are removed to access the backplane 110. Since the drives 106 themselves are typically hot-swappable and can be removed without tools, the removal or installation of the expander module 112 can be performed hot and without tools. A plurality of expander modules similar to module 112 may be placed all around the backplane 110 and may manage protocols for a subset of drives 106, e.g., drives 106 that use connectors 108 proximate the module 112.

Expander module 114 is located on a lower side of the backplane 110 that faces away from the storage drives 106. The expander module is slidably removable via an opening in a side 116 of the enclosure 100. The side 116 of the enclosure is covered by a corresponding side 118 of a rack in a rack-mounted configuration of the enclosure 100. A plurality of expander modules similar to module 114 may be placed on side 116 of the enclosure 110, as well as opposite side 120, which is covered by side 122 of the rack. The module 114 may manage protocols for a subset of drives 106, e.g., drives 106 that use connectors 108 proximate the module 114.

Figure 2:
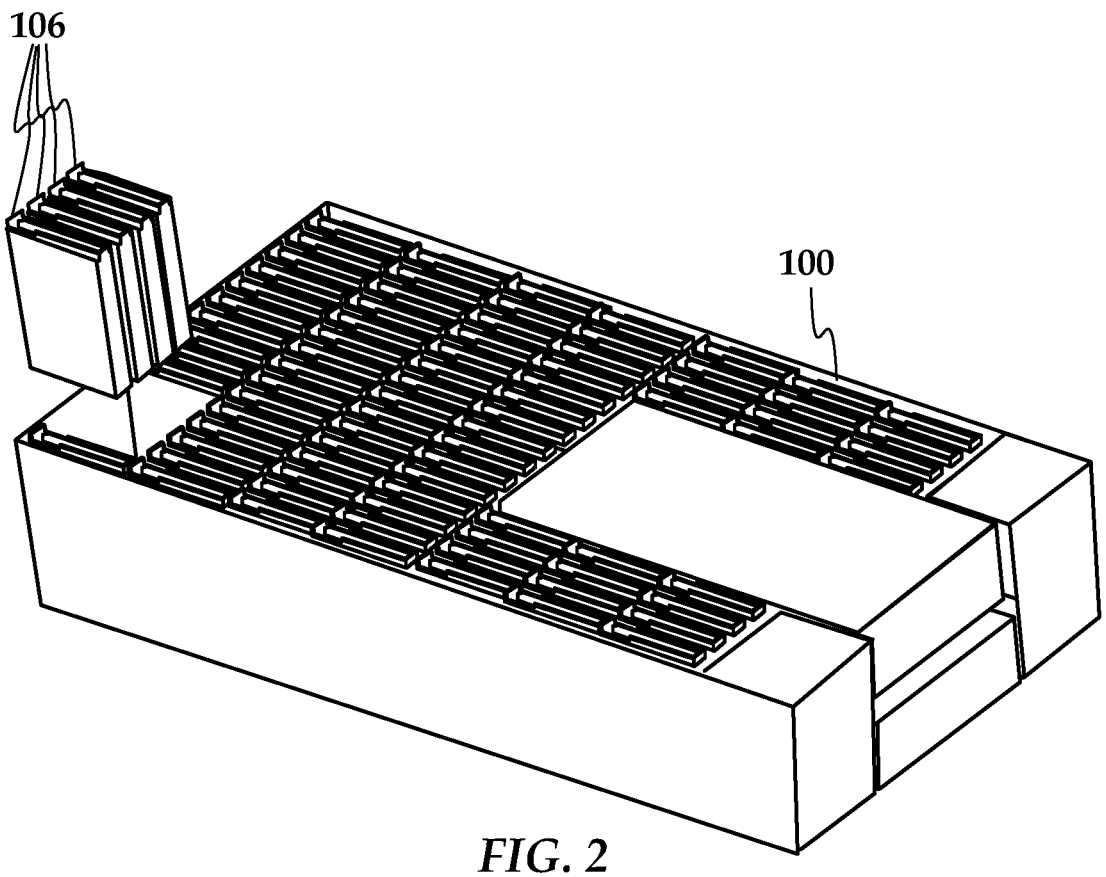
FIGS. 2 and 3 are perspective views of an expander module and enclosure according to a first example embodiment.
Figure 3:
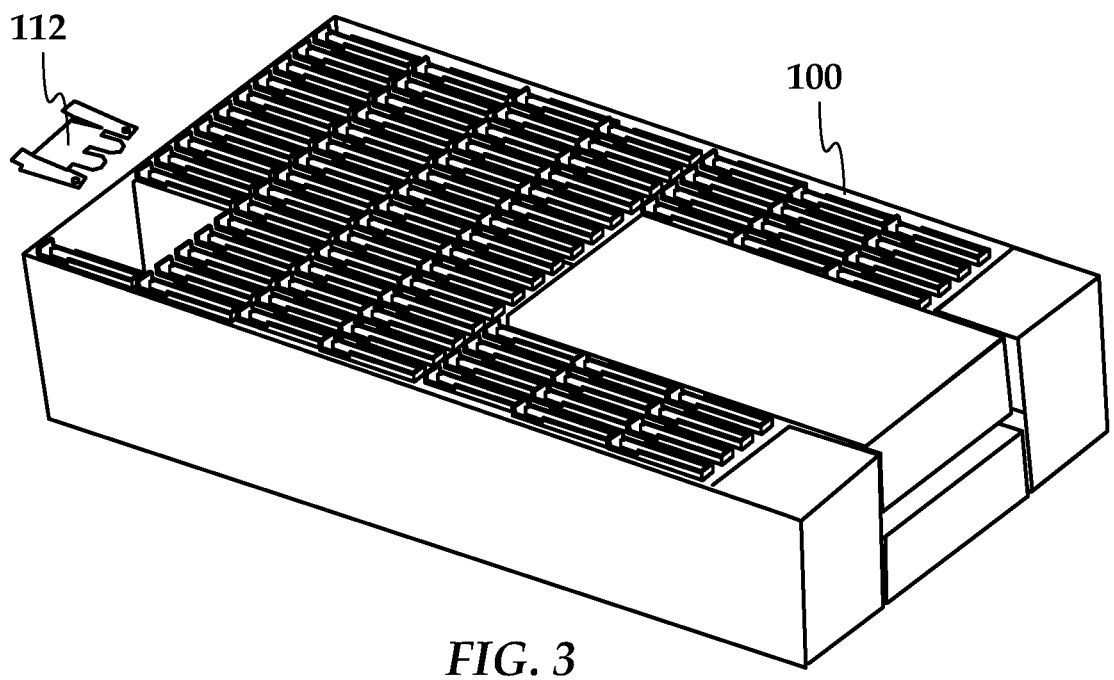
Figure 4:
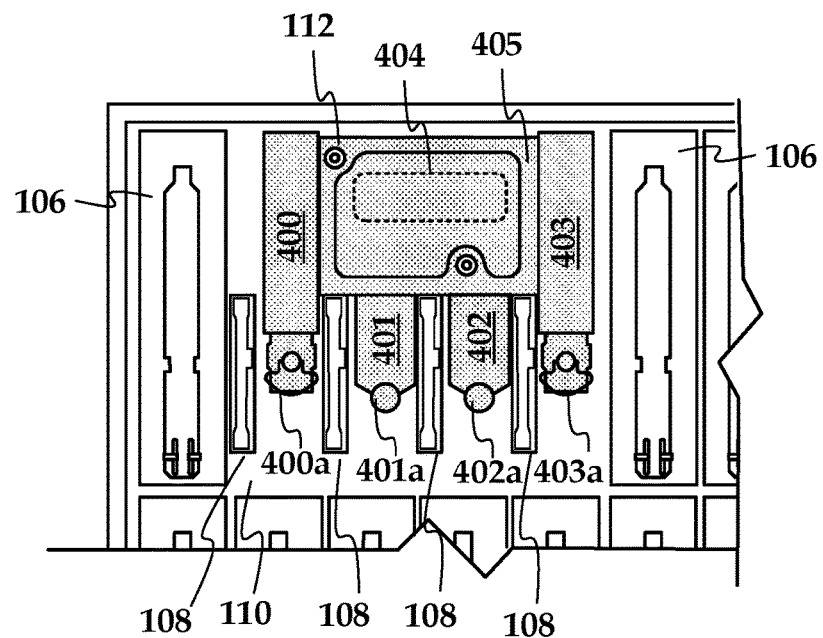
FIG. 4 is a top view of the expander module on a backplane as shown in FIGS. 2 and 3.

In FIGS. 2-6, details of the first type of expander module 112 are shown. In FIG. 2, a perspective view shows how the expander module 112 is accessed. Drives 106 are shown being removed from the top, which allows access to the backplane. In FIG. 3, a perspective view shows the expander module 112 being installed or removed from the enclosure. In FIG. 4, a close-up plan view shows the module 112 (shaded) installed on the backplane 110. The module includes four arms 400-403 that extend from a body portion 405 of the module 112. The arms 400-403 each extend between pairs of adjacent connectors 108. The ends of outer arms 400, 403 include mechanical locking elements, in this case twist locks 400a, 403a that interface with holes on the backplane 110. It will be understood that any type of locking element may be used on arms 400, 403, e.g., push to lock/release, thumb screws, magnetic fasteners, hook and loop fasteners, etc. The arms 400-402 provide a mechanical interface to the backplane 110, as well as providing heat sinking and addition component mounting areas.

Figure 5:
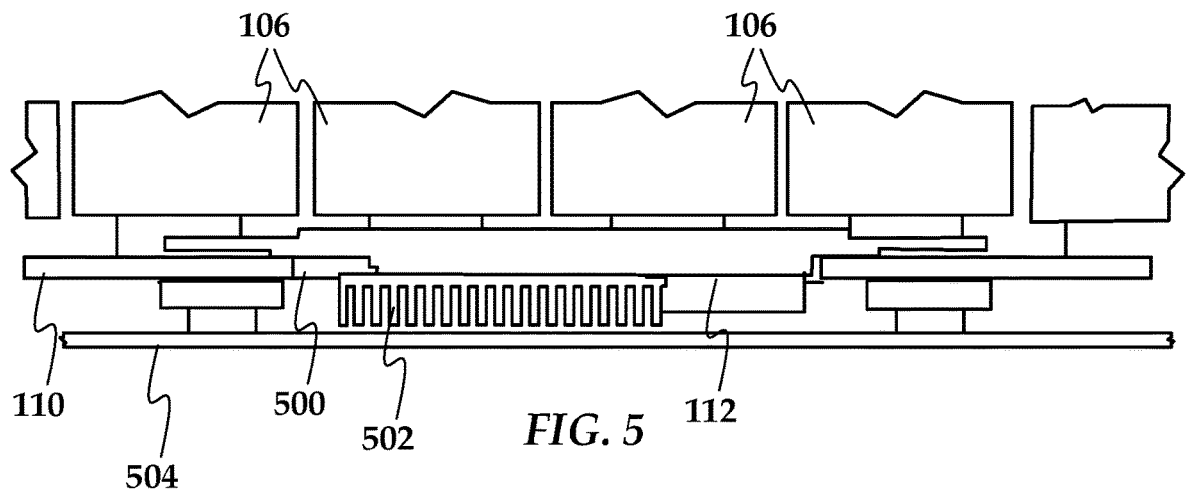
FIG. 5 is a cross-sectional view of the expander module and backplane shown in FIG. 4.
Figure 6:
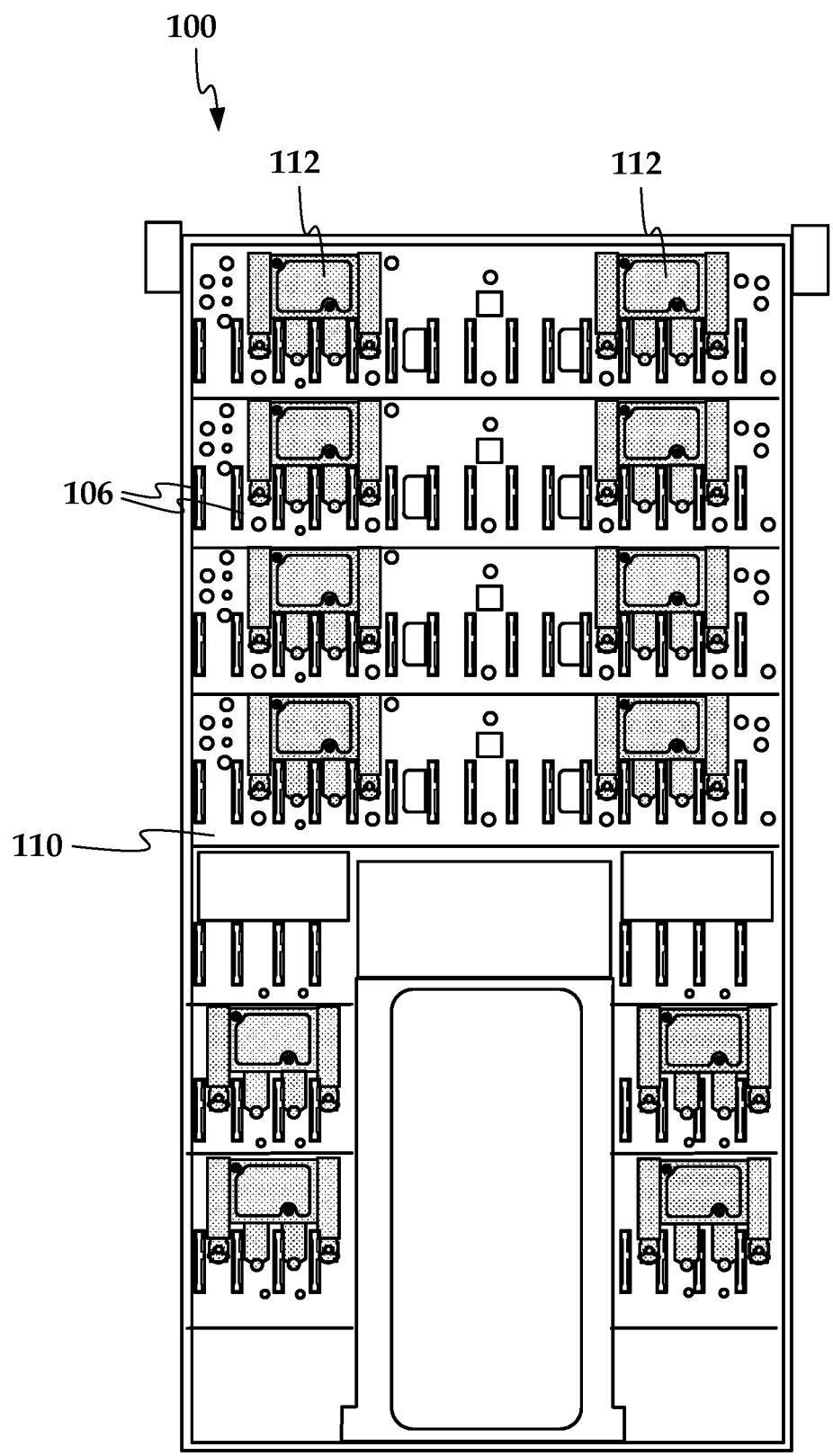
FIG. 6 is a top view of a data storage array with a plurality of expander modules according to an example embodiment.

Interface elements 401a, 402a at the ends of inner arms 401 and 402 may include pins that interface with matching holes in the backplane 110. These may be non-locking, e.g., used for initial positioning of the module 112 on the backplane. A connector 404 electrically couples the module to the backplane. FIG. 5 is a cross-sectional view that shows these elements of the expander module 112. A portion of the expander module 112, including a heat sink 502, extends through a void 508 in the backplane 110. The module is spaced so that there is a clearance between the heat sink 502 and bottom cover 504 of the enclosure.

Figure 7:
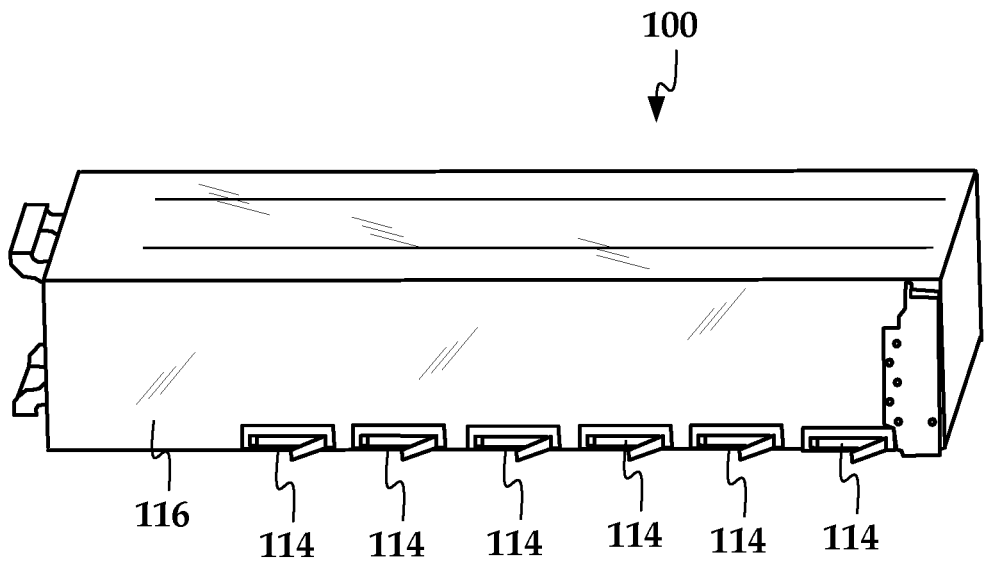
FIGS. 7-10 are perspective views of an expander module and enclosure according to a second example embodiment.
Figure 8:
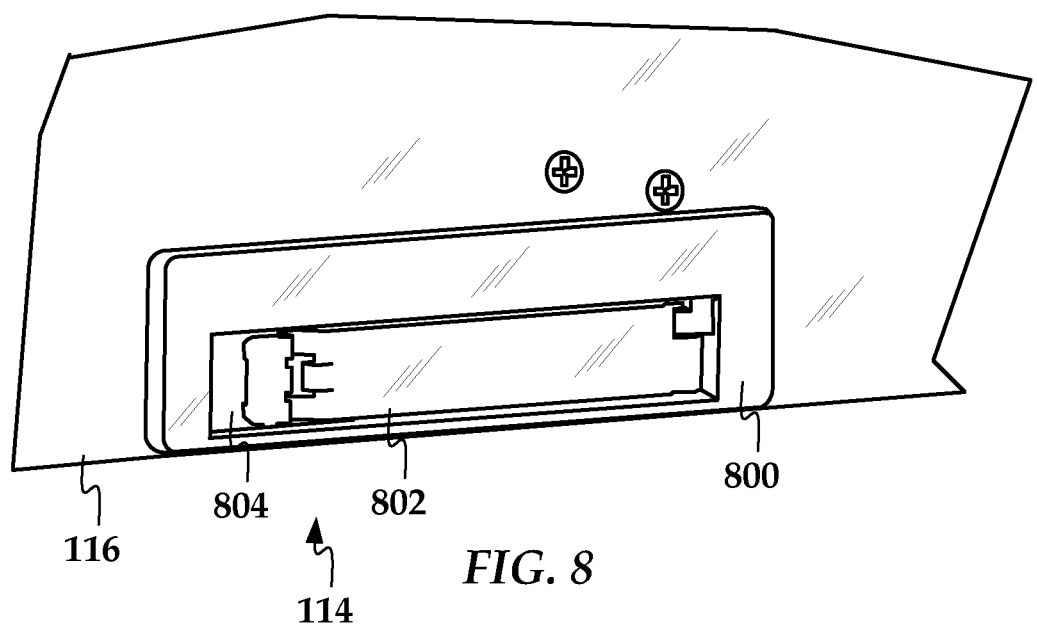

In FIGS. 7-10 perspective views show details of expander module 114 according to a second example embodiment. The expander module 114 is mounted under the drive backplane 110, between the backplane and a bottom cover of the enclosure 100. As seen in FIG. 7, the expander modules 114 are slidably removable from side 116 of the enclosure, as well as opposing side 120 (see FIG. 1). As seen in the close-up view of FIG. 8, the expander module 114 includes a faceplate 800 and locking lever 802. The faceplate 800 rests against the side 116 of the enclosure 100. The lever 802 rests inside a cavity 804 in the faceplate 800 when the module 114 is locked in place.

Figure 9:
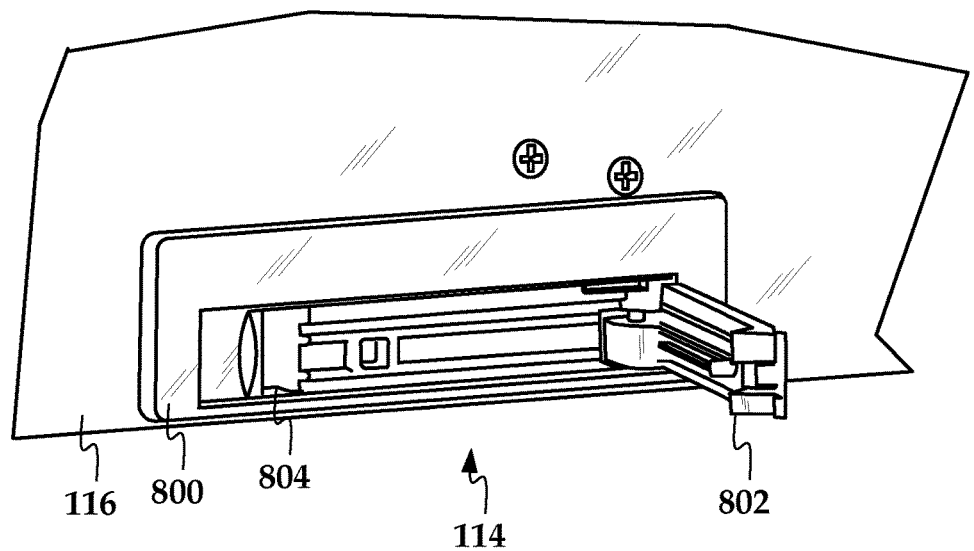
Figure 10:
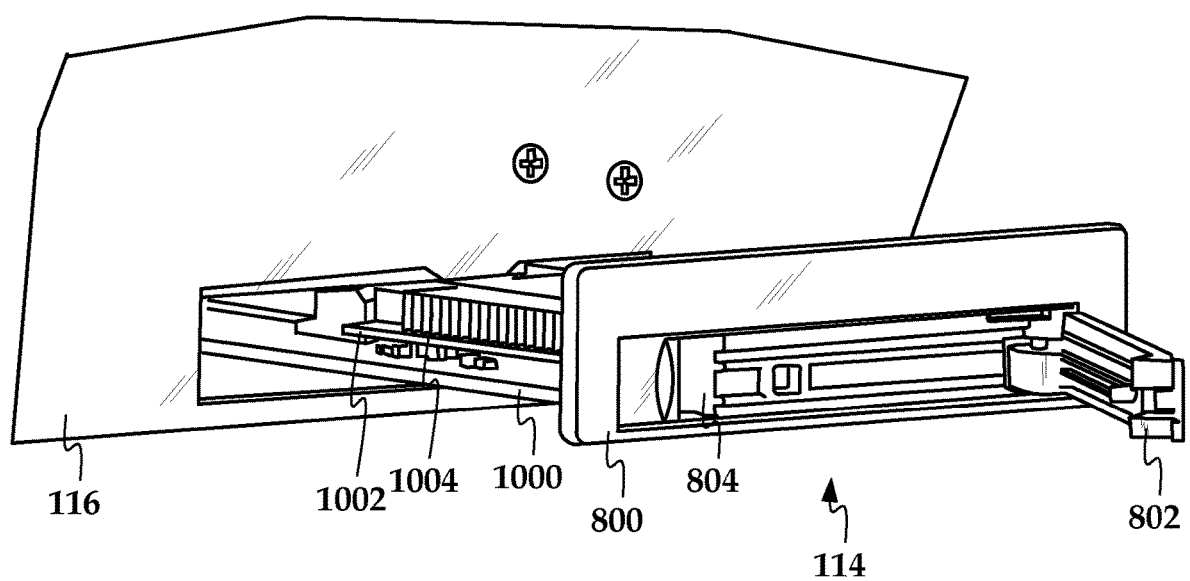
Figure 11:
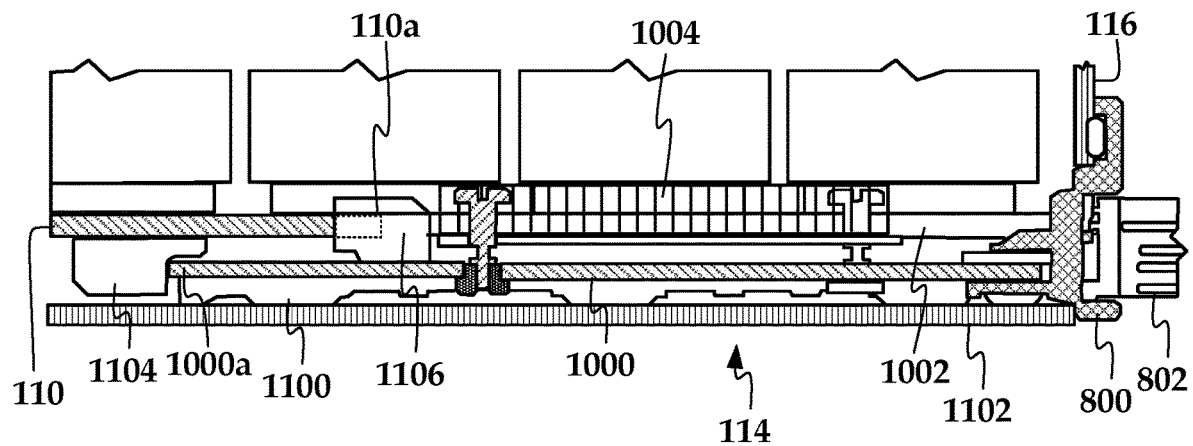
FIG. 11 is a cross-sectional view of the expander module and backplane shown in FIGS. 7-10.
Figure 12:
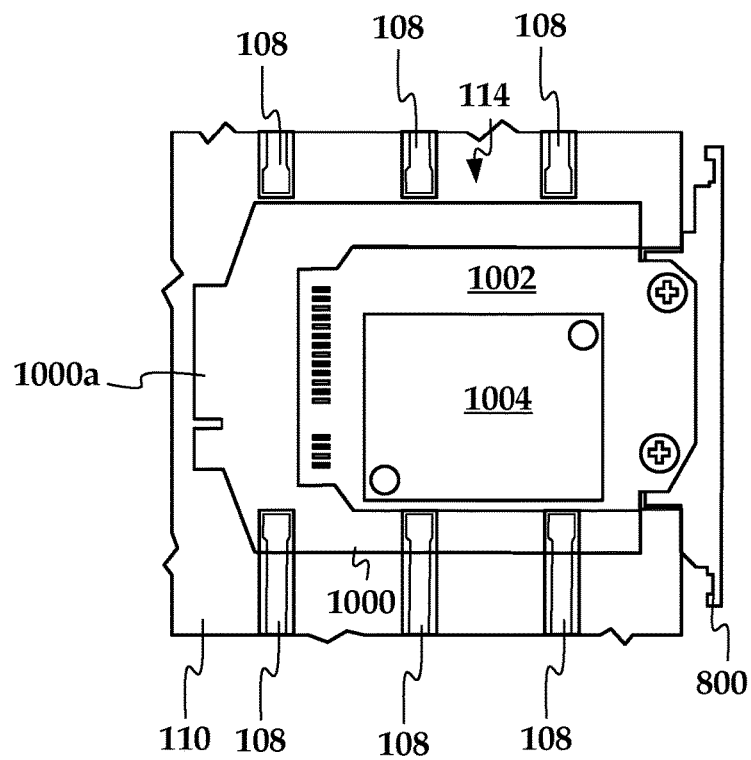
FIG. 12 is a top view of the expander module and backplane shown in FIGS. 7-10.

As seen in FIG. 9, the lever 802 can be rotated outwards to remove the expander module. As seen in FIG. 10, the module 114 can be slid away from the enclosure 100 for removal. The module 114 includes circuit boards 1000, 1002, the latter having a heat sink 1004 mounted on top. In FIGS. 11 and 12, respective cross-sectional and top views show additional details of the module 114 installed on the backplane 110.

As seen in FIG. 11, the expander module 114 includes a sliding member 1100 that is located between the bottom circuit board 1000 of the module 114 and a bottom panel 1102 of the enclosure. A connector 1104 extends from a lower surface of the backplane 110, and an end 1000a of the lower circuit board 1000 interfaces with this connector 1104. The expander module 114 include a second connector 1106 that is mounted to the lower board 1000. The second connector 1106 interfaces with an edge 110a of the backplane 110. The backplane 110 includes a cutout to facilitate the module 114, and this connecting edge 110a is on one side of the cutout. In FIG. 11, a top view shows where the expander module 114 is located between the connectors 108 on the backplane 110. It will be understood that the connectors shown in FIGS. 10 and 11 may be configured differently than shown, e.g., using two mating connectors instead of circuit board edge connectors.

In summary, hot-swappable, expander modules have been described. It is side mounted while the enclosure is extended from the rack. It supports multiple point-to-point topologies including, but not limited to SATA, SAS and Ethernet. This allows the hot swapping of the expander module without sacrificing drive density. This solution also allows for a better air flow path over the module for improved cooling performance.

Figure 13:
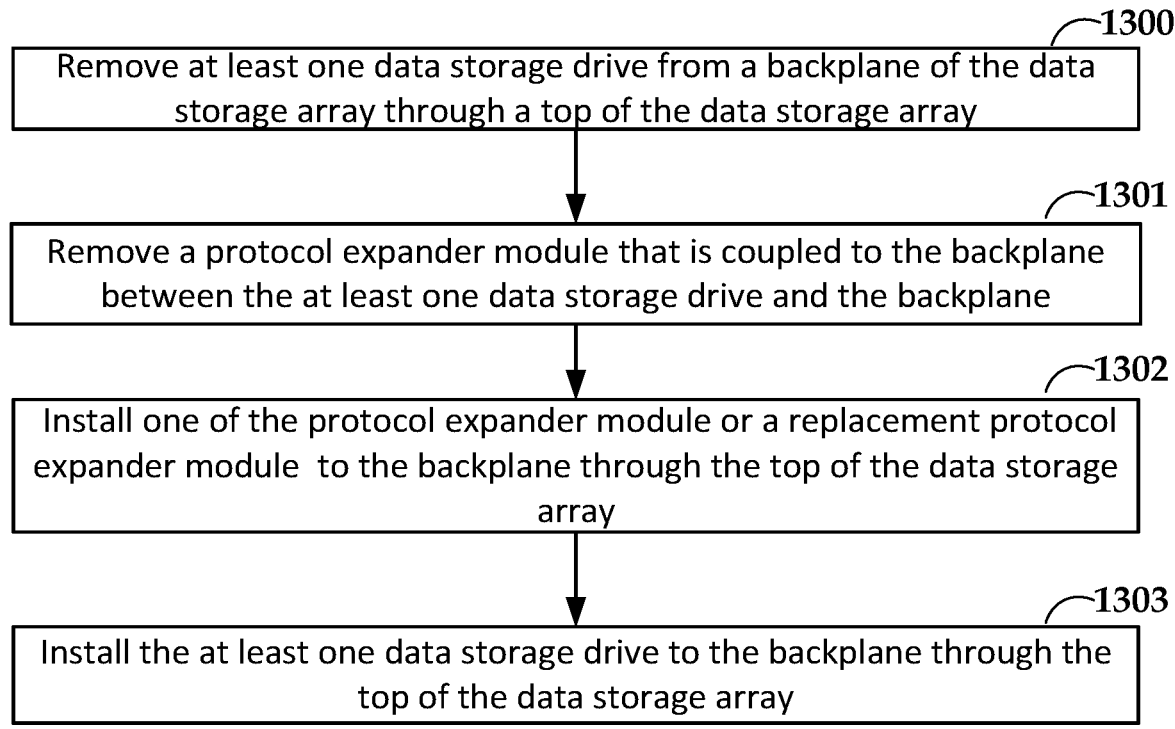
FIGS. 13 and 14 are flowcharts of methods according to example embodiments.

In FIG. 13, a flowchart illustrates a method according to an example embodiment. The method involves, while power is applied to a data storage array, removing 1300 at least one data storage drive from a backplane of the data storage array. The data storage drive is removed through a top of the data storage array. After removing 1300 the drive and with the power still applied, a protocol expander module that is coupled to the backplane between the at least one data storage drive and the backplane is removed 1301. The expander module is hot-swappable from the backplane through the top of the data storage array. The method further involves, with the power still applied, installing 1302 one of the protocol expander module or a replacement protocol expander module to the backplane through the top of the data storage array. The at least one data storage drive is then installed 1303 to the backplane through the top of the data storage array.

Figure 14:
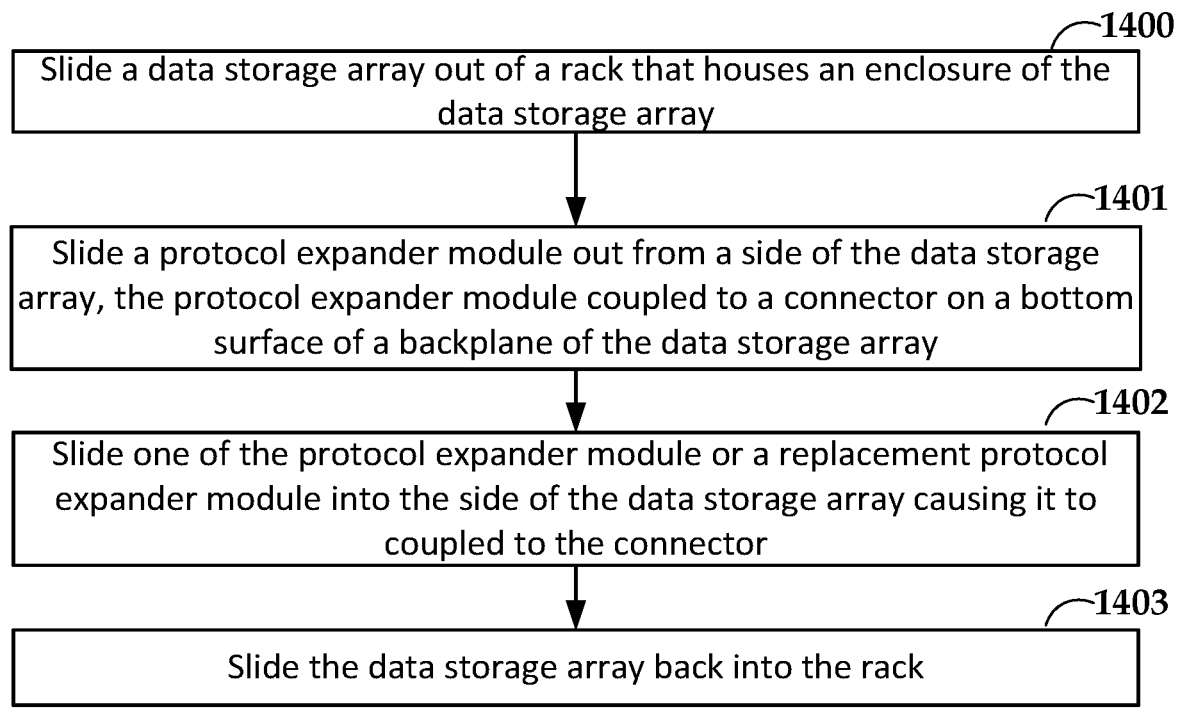

In FIG. 14, a flowchart illustrates a method according to another example embodiment. The method involves, while power is applied to a data storage array, sliding 1400 a data storage array out of a rack that houses an enclosure of the data storage array. This exposes a faceplate of a protocol expander module that was hidden by a corresponding side of the rack. A protocol expander module is slid 1401 out from a side of the data storage array. The protocol expander module is coupled to a connector on a bottom surface of a backplane of the data storage array. One of the protocol expander module or a replacement protocol expander module is slid 1402 into the side of the data storage array causing it to be coupled to the connector. The data storage array is then slide 1403 back into the rack.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:
1. A data storage array, comprising:
an enclosure;
a backplane at the base of the enclosure, the backplane comprising a plurality of drive connectors on a top surface of the backplane and at least one protocol module connector on the top surface;

a plurality of data storage drives coupled to the drive connectors of the backplane, a major surface of the data storage drives normal to the backplane; and a protocol expander module coupled to the at least one protocol module connector of the backplane such that the protocol expander module is positioned in a gap between at least one of the data storage drives and the top surface of the backplane, the protocol expander module hot-swappable from the backplane through a top of the enclosure;

wherein the protocol expander module comprises a body portion and at least two arms extending from the body portion, each of the at least two arms located between a pair of adjacent connectors of the backplane.

2. The data storage array of claim 1, wherein the data storage drives are slidably removable via the top of the enclosure, and wherein the protocol expander module is removable by first removing one or more of the storage drives that cover the protocol expander module and then lifting the expander module though the top of the enclosure.

3. The data storage array of claim 1, wherein the backplane comprises a void to facilitate at least part of the protocol expander module that extends toward a bottom cover of the enclosure.

4. The data storage array of claim 1, wherein ends of the at least two arms comprise tool-less mechanical locking elements that interface with the backplane.

5. The data storage array of claim 1, wherein the at least two arms comprise four arms each located between respective pairs of the adjacent connectors, the four arms including two outer arms comprising mechanical locking elements that interface with the backplane and two inner arms.

6. The data storage array of claim 1, wherein the body comprises an electrical connector that interfaces with the at least one protocol module connector on the backplane.

7. The data storage array of claim 1, wherein the protocol expander module provides a point-to-point protocol that couples the data storage drives to a controller.

8. The data storage array of claim 1, wherein the protocol expander module is capable of providing at least two communications protocols for the data storage drives, the at least two communications protocols comprising any two of Small Computer System Interface (SCSI), Serial Attached SCSI, Serial AT Attachment, Peripheral Component Interconnect (PCI), PCI Express (PCIe), Fibre Channel, and Ethernet.

9. A method comprising: while power is applied to a data storage array, removing at least one data storage drive from a backplane of the data storage array, the data storage drive being removed through a top of the data storage array, a protocol expander module being positioned in a gap between the at least one storage drive and the top surface of the backplane prior to removal of the at least one data storage drive; and after removing the drive and with the power still applied, removing the protocol expander module that is coupled to the backplane via an electrical connector, the protocol expander module being hot-swappable from the backplane through the top of the data storage array;

wherein the protocol module comprises a body portion and at least two arms extending from the body portion, each of the at least two arms located between a pair of adjacent connectors of the backplane, ends of the at least two arms comprising tool-less mechanical locking elements that interface with the backplane, and wherein removing the protocol expander module comprises unlocking the mechanical locking element.

10. The method of claim 9, further comprising, with the power applied:

installing one of the protocol expander module or a replacement protocol expander module to the backplane through the top of the data storage array; and installing the at least one data storage drive to the backplane through the top of the data storage array.

11. The method of claim 9, wherein the protocol expander module provides a point-to-point protocol that couples one or more drives of the data storage array to a controller.

* * * * *